(12) United States Patent
Benjamin

(10) Patent No.: US 10,671,346 B2
(45) Date of Patent: Jun. 2, 2020

(54) INFORMATION PROCESSING APPARATUS AND TERMINAL DEVICE

(71) Applicant: FDC Global Co., Ltd., Tokyo (JP)

(72) Inventor: John Edward Benjamin, Tokyo (JP)

(73) Assignee: FDC Global Co., Ltd., Tokyo (JP)

( * ) Notice: Subject to any disclaimer, the term of this patent is extended or adjusted under 35 U.S.C. 154(b) by 344 days.

(21) Appl. No.: 15/840,478

(22) Filed: Dec. 13, 2017

(65) Prior Publication Data

US 2018/0173496 A1 Jun. 21, 2018

(30) Foreign Application Priority Data

Dec. 19, 2016 (JP) .................................. 2016-245322

(51) Int. Cl.
*G06F 16/00* (2019.01)
*G06F 7/20* (2006.01)
(Continued)

(52) U.S. Cl.
CPC .............. *G06F 7/20* (2013.01); *G06F 16/248* (2019.01); *G06F 16/2455* (2019.01); *G06F 16/252* (2019.01)

(58) Field of Classification Search
CPC ........ G06F 7/20; G06F 16/248; G06F 16/252; G06F 16/2455; G06F 16/221;
(Continued)

(56) References Cited

U.S. PATENT DOCUMENTS

2007/0162483 A1   7/2007   Sasaki
2009/0216986 A1*  8/2009   Sakurai ................. G06F 3/0607
                                                      711/170
(Continued)

FOREIGN PATENT DOCUMENTS

JP    2006-53689 A    2/2006
JP    2007-188235 A   7/2007
(Continued)

OTHER PUBLICATIONS

Office Action dated Aug. 15, 2017 from JPO in connection with the counterpart Japanese Patent Application No. 2016-245322 with a partial English translation.
(Continued)

*Primary Examiner* — Anh Ly
(74) *Attorney, Agent, or Firm* — Hauptman Ham, LLP

(57) ABSTRACT

A terminal device according to an embodiment of the present invention includes: a display output unit configured to be implemented by a programmed processor, the display output unit that outputs a first area into which a first key data is enterable through a user's operation, a second area into which a second key data is enterable through the user's operation, a third area into which a third key data is enterable through the user's operation, a fourth area into which a fourth key data is enterable through the user's operation, a fifth area into which a fifth key data is enterable through the user's operation, and a sixth area formed by the second area and the third area crossing each other; and a transmitting unit configured to be implemented by a programmed processor.

5 Claims, 8 Drawing Sheets

(51) Int. Cl.
  *G06F 16/248* (2019.01)
  *G06F 16/25* (2019.01)
  *G06F 16/2455* (2019.01)
(58) Field of Classification Search
  CPC ............... G06F 16/25; G06F 16/24578; G06F 16/2365; G06F 16/285; G06F 16/00; G06F 17/10; G06F 17/30; G06F 7/544; G06F 16/24535; G06F 16/24539; G06F 17/30451; G06Q 50/01
  See application file for complete search history.

(56) References Cited

U.S. PATENT DOCUMENTS

| | | | |
|---|---|---|---|
| 2010/0299341 A1 | 11/2010 | Hart et al. | |
| 2012/0110001 A1* | 5/2012 | Young | G06F 17/246 707/769 |
| 2012/0137204 A1* | 5/2012 | Petrovicky | G06F 17/246 715/219 |
| 2012/0202479 A1* | 8/2012 | Sugitani | G08C 17/02 455/420 |
| 2012/0254787 A1 | 10/2012 | Toman | |
| 2013/0163017 A1* | 6/2013 | Matsuda | H04N 1/0023 358/1.13 |
| 2013/0250354 A1* | 9/2013 | Kato | H04N 1/00299 358/1.15 |
| 2014/0289759 A1* | 9/2014 | Nakano | G06Q 30/06 725/31 |
| 2015/0277957 A1* | 10/2015 | Shigeta | G06F 9/45558 718/1 |
| 2016/0019281 A1 | 1/2016 | Hariharan et al. | |
| 2016/0156516 A1* | 6/2016 | Nishi | H04L 43/0829 370/329 |
| 2016/0337917 A1* | 11/2016 | Kawai | H04W 36/0088 |
| 2016/0350133 A1* | 12/2016 | Imai | G06F 8/33 |
| 2017/0206254 A1 | 7/2017 | Ogasawara | |
| 2017/0262424 A1 | 9/2017 | Ogawa | |
| 2018/0063367 A1* | 3/2018 | Kitayama | H04N 1/32771 |

FOREIGN PATENT DOCUMENTS

| | | |
|---|---|---|
| JP | 2008-015960 A | 1/2008 |
| JP | 2010-277586 A | 12/2010 |
| JP | 2012-123607 A | 6/2012 |
| JP | 2014-215803 A | 11/2014 |
| JP | 2015-041309 A | 3/2015 |
| JP | 2016-057802 A | 4/2016 |
| WO | 2016/007788 A1 | 1/2016 |

OTHER PUBLICATIONS

Notice of Allowance dated Oct. 31, 2017 from JPO in connection with the counterpart Japanese Patent Application No. 2016-245322 with a partial English translation.
Japanese Office Action dated Aug. 15, 2017 for the corresponding Japanese application No. 2016-245322 with its English Machine Translation.
Japanese Notice of Allowance dated Oct. 31, 2017 for the corresponding Japanese application No. 2016-245322 with its English Machine Translation.

* cited by examiner

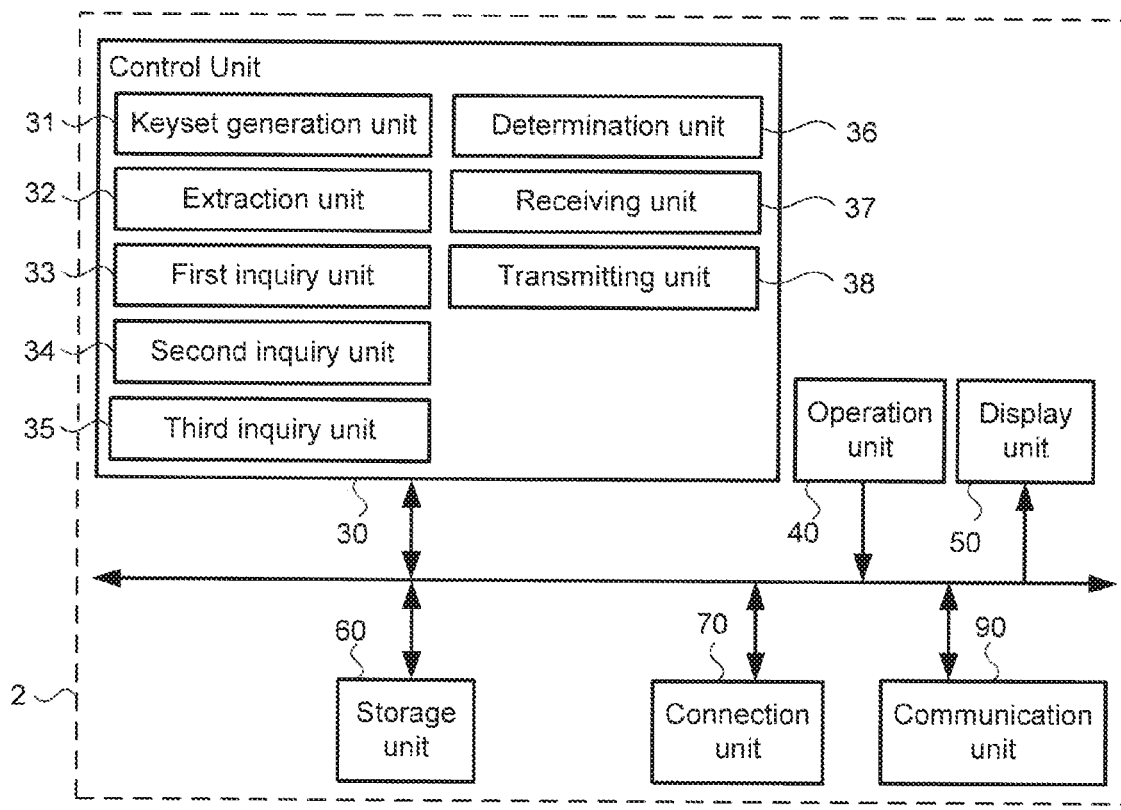
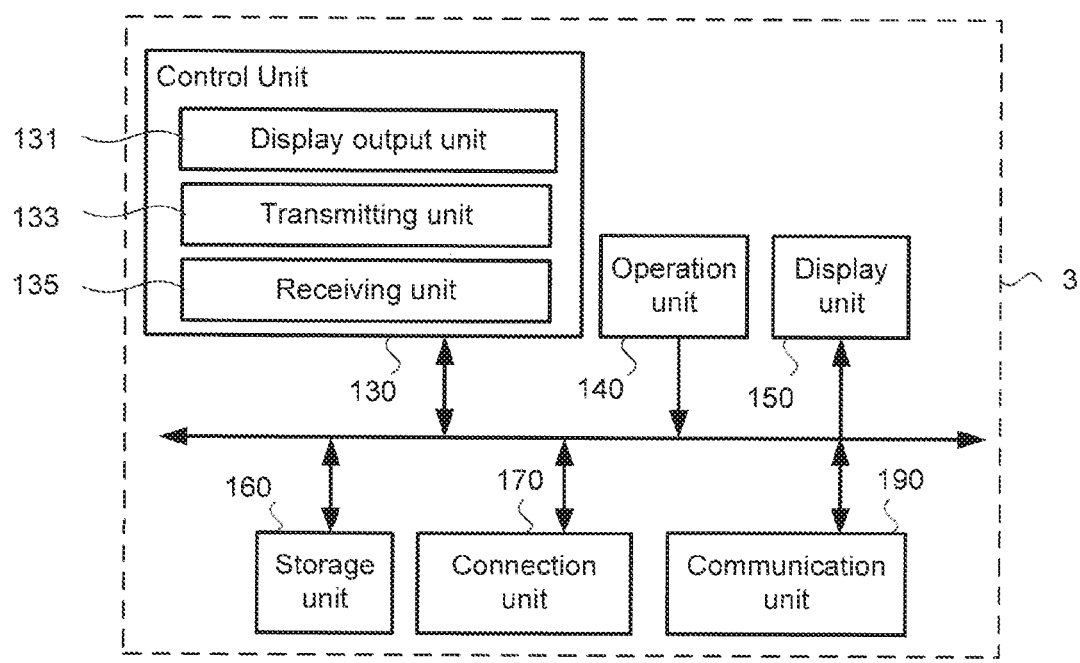

| | | | | | AK |
|---|---|---|---|---|---|
| | XXXX | 2015 | 2016 | 2017 | 2017 |
| | LAST DAY OF PERIOD | 2015/12/31 | 2016/12/31 | 2017/12/31 | 2017/12/31 |
| | PERIOD SOURCE | ACTUAL DATA | CONSENSUS DATA | CONSENSUS DATA | A ECONOMY |
| | NUMBER OF DAYS WITHIN PERIOD | 365 | 366 | 365 | 365 |
| | NET PROFIT | 16483 | 12022 | 13190 | 12909 |
| | RATING | 3.448 | 3.207 | 3.111 | 3.111 |
| | PER | 12.36 | 13.21 | 10.12 | 12.14 |
| | HIGH | 215.9 | 199.21 | 176.3 | 164.95 |
| | LOW | 172.57 | 150.5 | 131.65 | 116.9 |
| 2/14/2015 | STOCK PRICE | 214.81 | | | |
| | STOCK PRICE AVERAGE | 194.14 | 182.32 | 155.37 | 145.12 |
| YYYY | STOCK PRICE AVERAGE | 214.52 | 200.14 | 183.97 | 172.98 |

FIG. 10

| | | |
|---|---|---|
| 601 — ITEMS | VALUES | |
| 603 — SECURITIES CODE | | |
| 605 — SECTOR | STOCK PRICE | |
| 607 — TERM END | DEFAULT: LATEST | |
| 609 — PERIOD TYPE | DEFAULT: AUTO | |
| 611 — SOURCE | DEFAULT: AUTO | |

| 613 — RANGE | FIXED DATE ▽ | |
|---|---|---|
| | 6/1/2014 — 6/1/2016 | |
| 615 — CYCLE | EVERY MONTH ▽ | ASCENDING ORDER ▽ — 617 |

| | STOCK PRICE | XXXX | YYYY | JJJJ |
|---|---|---|---|---|
| | 6/1/2014 | 11770 | 1627 | 135 |
| | 7/30/2014 | 12325 | 1791 | 122 |
| | 8/31/2014 | 11530 | 1899 | 127 |
| | 9/30/2014 | 11930 | 1991 | 127 |
| | 10/30/2014 | 11235 | 2055 | 123 |
| | 11/30/2014 | 13760 | 2600 | 134 |
| | . | . | . | . |
| | 3/31/2016 | 16800 | 2900 | 130 |
| | 4/30/2016 | 15155 | 2778 | 134 |
| | 5/30/2016 | 16000 | 3090 | 129 |
| | 6/1/2016 | 16055 | 3091 | 126 |

FIG. 12

| | | | | JPY |
|---|---|---|---|---|
| | STOCK PRICE | XXXX | YYYY | JJJJ |
| | 6/1/2014 | 11770 | 1627 | 15679 |
| | 7/30/2014 | 12325 | 1791 | 14176 |
| | 8/31/2014 | 11530 | 1899 | 14699 |
| | 9/30/2014 | 11930 | 1991 | 14766 |
| | 10/30/2014 | 11235 | 2055 | 14534 |
| | 11/30/2014 | 13760 | 2600 | 15576 |
| | . | . | . | . |
| | 3/31/2016 | 16800 | 2900 | 15172 |
| | 4/30/2016 | 15155 | 2778 | 15627 |
| | 5/30/2016 | 16000 | 3090 | 14980 |
| | 6/1/2016 | 16055 | 3091 | 14654 |

INFORMATION PROCESSING APPARATUS AND TERMINAL DEVICE

CROSS REFERENCE TO RELATED APPLICATIONS

This application is based upon and claims the benefit of priority from the prior Japanese Patent Application No. 2016-245322, filed on Dec. 19, 2016, the entire contents of which are incorporated herein by reference.

FIELD

An embodiment of the present invention relates to an information processing apparatus and a terminal.

BACKGROUND

Conventionally, as a technique by which data provided by a database service is acquired through a computer terminal and displayed as a graph or a table on a display of the terminal, there has been an invention by which acquired data is written onto database access software and displayed on a display (see, for example, Japanese Unexamined Patent Application Publication No. 2007-188235).

However, the technique disclosed in Japanese Unexamined Patent Application Publication No. 2007-188235 undesirably requires a user to take the trouble to enter a function into a cell of a worksheet.

SUMMARY

An embodiment of the present invention provides an information processing apparatus including: a keyset generation unit configured to be implemented by a programmed processor, the keyset generation unit that, upon receiving, from a terminal device, a plurality of key data including a first information regarding a m-th row and a n-th column and first key data corresponding to the m-th row and the n-th column, a second information regarding the m-th row and a (n+1)-th column and second key data corresponding to the m-th row and the (n+1)-th column, and a third information regarding a (m+1)-th row and the n-th column and third key data corresponding to the (m+1)-th row and the n-th column, combines the plurality of key data to generate a keyset; an extraction unit configured to be implemented by a programmed processor, the extraction unit that compares the keyset with a table storing key data that require inquiries at a database or a data source and extracts the first key data, the second key data, and the third key data from the keyset; a first inquiry unit configured to be implemented by a programmed processor, the first inquiry unit that, on the basis of the first key data, the second key data, and the third key data extracted by the extraction unit, makes an inquiry at the database for a first result data corresponding to the first key data, the second key data, and the third key data; a determination unit configured to be implemented by a programmed processor, the determination unit that, upon receiving, from the database, a signal indicating that the database does not have the first result data, compares the first key data, the second key data, and the third key data with a table storing a formula and determines whether the formula is included in any of the first key data, the second key data, and the third key data; a second inquiry unit configured to be implemented by a programmed processor, the second inquiry unit that, when the determination unit has determined that the formula is included in any of the first key data, the second key data, and the third key data, makes an inquiry at the database for a second result data corresponding to the formula; a third inquiry unit configured to be implemented by a programmed processor, the third inquiry unit that, when the determination unit has determined that the formula is not included in any of the first key data, the second key data, and the third key data, makes an inquiry at the data source for the first result data and, upon receiving, from the database, a signal indicating that the database does not have the second result data corresponding to the formula, makes an inquiry at the data source for the second result data; a receiving unit configured to be implemented by a programmed processor, the receiving unit that receives the first result data or the second result data from the database or the data source; and a transmitting unit configured to be implemented by a programmed processor, the transmitting unit that transmits the first result data or the second result data to the terminal device.

An embodiment of the present invention provides a method, a computer comprising a keyset generation unit, an extraction unit, a first inquiry unit, a determination unit, a second inquiry unit, a third inquiry unit, a receiving unit, a transmitting unit configured to be implemented by a programmed processor, the method comprising causing the keyset generation unit to, upon receiving, from a terminal device, a plurality of key data including information regarding the m-th row and the n-th column and first key data corresponding to the m-th row and the n-th column, information regarding the m-th row and the (n+1)-th column and second key data corresponding to the m-th row and the (n+1)-th column, and information regarding the (m+1)-th row and the n-th column and third key data corresponding to the (m+1)-th row and the n-th column, combine the plurality of key data to generate a keyset; causing the extraction unit to compare the keyset with a table storing key data that require inquiries at a database or a data source and extract the first key data, the second key data, and the third key data from the keyset; causing the first inquiry unit to, on the basis of the first key data, the second key data, and the third key data extracted, make an inquiry at the database for first result data corresponding to the first key data, the second key data, and the third key data; causing the determination unit to, upon receiving, from the database, a signal indicating that the database does not have the first result data, compare the first key data, the second key data, and the third key data with a table storing a formula and determine whether the formula is included in any of the first key data, the second key data, and the third key data; causing the second inquiry unit to, when it is determined that the formula is included in any of the first key data, the second key data, and the third key data, make an inquiry at the database for second result data corresponding to the formula; causing the third inquiry unit to, when it is determined that the formula is not included in any of the first key data, the second key data, and the third key data, make an inquiry at the data source for the first result data and, upon receiving, from the database, a signal indicating that the database does not have the second result data corresponding to the formula, make an inquiry at the data source for the second result data; causing the receiving unit to receive the first result data or the second result data from the database or the data source; and causing the transmitting unit to transmit the first result data or the second result data to the terminal device.

An embodiment of the present invention provides a terminal device including: a display output unit configured to be implemented by a programmed processor, the display output unit that outputs a first area into which a first key data is enterable through a user's operation, a second area into which a second key data is enterable through the user's operation, a third area into which a third key data is enterable through the user's operation, a fourth area into which a fourth key data is enterable through the user's operation, a fifth area into which a fifth key data is enterable through the user's operation, and a sixth area formed by the second area and the third area crossing each other; and a transmitting unit configured to be implemented by a programmed processor, the transmitting unit that, upon entry of the first key data, the second key data, and the third key data into at least the first area, the second area, and the third area, respectively, of the first to fifth areas, transmits, to a server, the first key data and information regarding an area corresponding to the first key data, the second key data and information regarding an area corresponding to the second key data, and the third key data and information regarding an area corresponding to the third key data, wherein upon receiving a result data from the server, the display output unit outputs the result data to the sixth area.

BRIEF DESCRIPTION OF DRAWINGS

FIG. 2 is a block diagram showing an example configuration of a server according to an embodiment of the present invention;

FIG. 3 is a block diagram showing an example configuration of a terminal device according to an embodiment of the present invention;

FIG. 10 is a diagram showing a user interface that is displayed on a terminal device according to a modification of an embodiment of the present invention;

FIG. 11 is a diagram showing an example of a table that is displayed on a terminal device according to a modification of an embodiment of the present invention; and FIG. 12 is a diagram showing an example of a table that is displayed on a terminal device according to a modification of an embodiment of the present invention.

DESCRIPTION OF EMBODIMENTS

Figure 1:
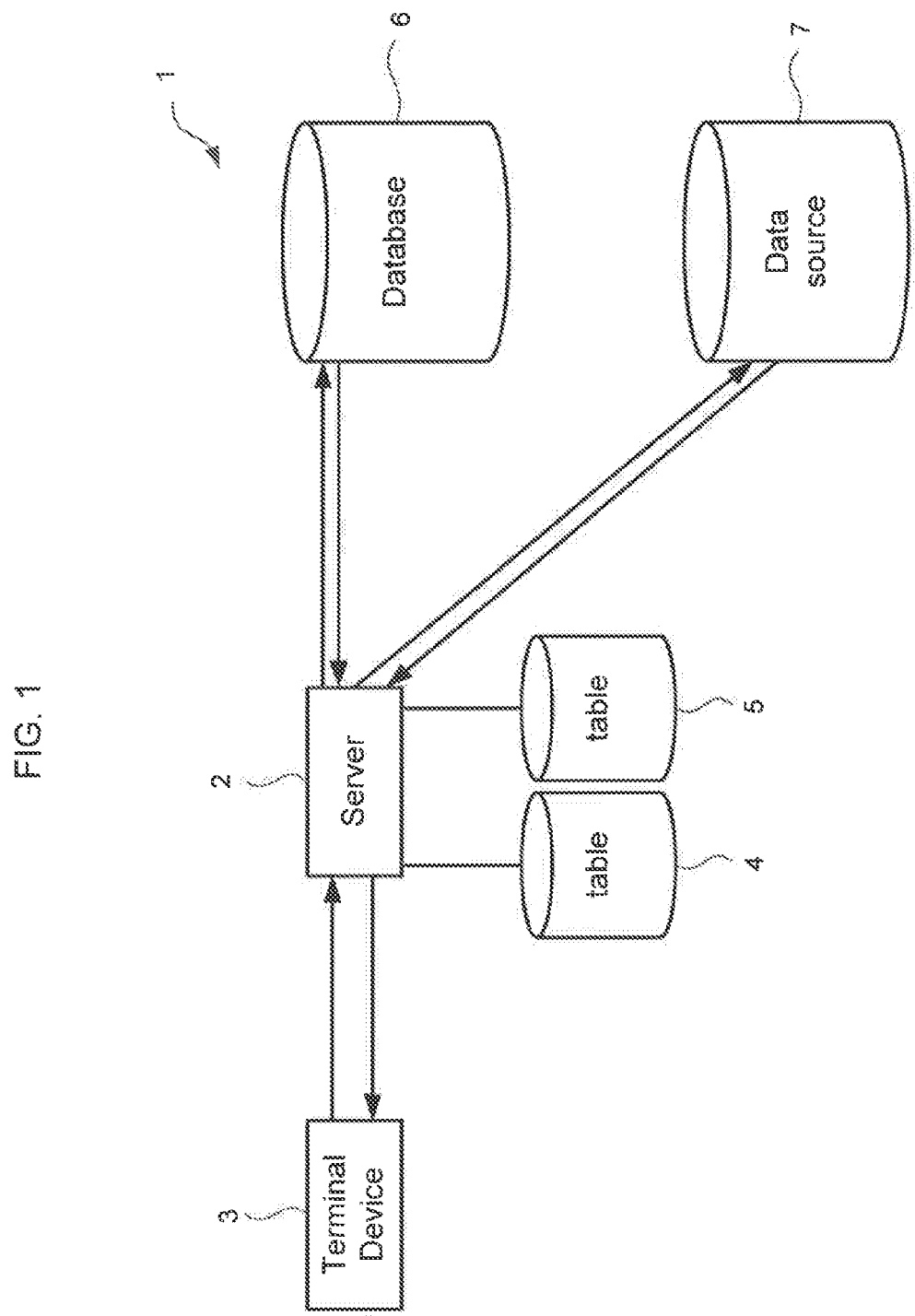
FIG. 1 is a diagram showing an example configuration of an information processing system according to an embodiment of the present invention.

An embodiment of the present invention is described in detail below with reference to the drawings. The embodiment to be described below is merely an example of embodiments of the present invention, and the present invention is not limited to these embodiments. It should be noted that, in the drawings to which reference is made in the present embodiment, the same elements or elements having similar functions are given the same reference signs or similar reference signs (reference signs each made by simply adding A, B, or the like to the end of a number), and a repeated description of such elements may be omitted.

Information Processing System

An information processing system 1 according to an embodiment of the present invention is described with reference to FIG. 1, which is a diagram showing an example configuration of an information processing system according to an embodiment of the present invention. The information processing system 1 includes a server 2, a terminal device 3, a table 4, a table 5, a database 6, and a data source 7.

The server 2 receives information from the terminal device 3. Further, the server 2 transmits information to the terminal device 3. The server 2 compares information received from the terminal device 3 with data stored in the table 4 or the table 5. The server 2 makes an inquiry at the database 6 and, in a case where the database 6 has desired data, receives the desired data from the database 6. Further, the server 2 may make an inquiry at the data source 7 and receive data from the data source 7. In this example, the server 2 and the data source 7 communicate with each other through the Internet.

In a case where the database 6 does not have the desired data and the desired data is received from the data source 7, the desired data is stored in the database 6. By being thus stored in the database 6, the desired data can be returned by the database 6 in response to the next and subsequent inquiries, if any, from the server 2. Therefore, in this case, the server 2 can acquire the desired data without making an inquiry at the data source 7. The communication between the server 2 and the data source 7 is slower and costlier than the communication between the server 2 and the database 6. The storage of the desired data in the database 6 achieves faster response and lower cost in the presence of the next and subsequent inquiries, if any, from the server 2. Such storage of the desired data in the database 6 shortens the time between a user's entry of key data into the terminal device 3 and the output of data corresponding to the key data thus entered.

Data stored in the database 6 may be deleted after the elapse of a predetermined period of time. This is because the stored data may become old. Further, this predetermined period of time may vary according to the nature of the data stored. For example, stock price data may be deleted every 10 seconds, as it varies every second. On the other hand, data such as the volume of sales as of Mar. 31, 2016 does not basically vary after that point in time. Therefore, such data may be deleted after the elapse of three years. The foregoing has described the information processing system 1.

Configuration of Information Processing Apparatus

Next, a server (information processing apparatus) 2 according to an embodiment of the present invention is described with reference to FIG. 2. FIG. 2 is a block diagram showing an example configuration of a server according to an embodiment of the present invention. The server 2 includes a control unit 30, an operation unit 40, a display unit 50, a storage unit 60, a connection unit 70, and a communication unit 90. These components are connected to one another via buses.

The storage unit 60 is a storage device such as a nonvolatile memory or a hard disk. The storage unit 60 includes a storage area in which to store an application program, such as the after-mentioned program, for achieving various functions. The program needs only to be executable by a computer, and is provided in a state of being stored in a computer-readable storage medium such as a magnetic storage medium, an optical storage medium, a magneto optical storage medium, or a semiconductor memory. In this case, the server 2 may include a device for reading the storage medium. Further, the program may be downloaded through a network.

The operation unit 40 outputs, to the control unit 30, a signal corresponding to an operation inputted by a user using an operation button or the like. The operation button includes, for example, a power switch, a cursor key, and the like, and needs only to be an operator that accepts instructions from the user. The display unit 50 is a display device such as a liquid crystal display or an organic EL display, and displays a screen (such as a setting screen) based on control exercised by the control unit 30. It should be the server 2 does not need to include the operation unit 40 and the display unit 50. In this case, an external device may be connected to the server 2 to substitute for the functions equivalent to the operation unit 40 and the display unit 50.

The connection unit 70 is a user interface for connecting to the aforementioned terminal device 3. In this example, the connection unit 70 and the terminal device 3 may be connected to each other either by cable or wirelessly.

The communication unit 19 connects to the network on the basis of the control exercised by the control unit 30 and transmits and receives information to and from an external device.

The control unit 30 includes an arithmetic processing circuit such as a CPU. The control unit 30 uses the CPU (computer) to execute the program stored in the storage unit 60 and thereby achieves functions for performing the after-mentioned keyset generation process, the after-mentioned extraction process, the after-mentioned first inquiry process, and the like. The keyset generation process and the extraction process are achieved by the after-mentioned keyset generation unit 31 and the after-mentioned extraction unit 32, respectively. Some or all of the components that achieve the functions here are not limited to being achieved by software by executing the program but may be achieved by hardware. It should be noted that the functions that are achieved by the control unit 30 include a function of controlling each unit of the apparatus.

The control unit 30 includes a keyset generation unit 31, an extraction unit 32, a first inquiry unit 33, a second inquiry unit 34, a third inquiry unit 35, a determination unit 36, a receiving unit 37, and a transmitting unit 38. In other words, a computer comprising a keyset generation unit 31, an extraction unit 32, a first inquiry unit 33, a determination unit 36, a second inquiry unit 34, a third inquiry unit 35, a receiving unit 37, a transmitting unit 38 configured to be implemented by a programmed processor.

Upon receiving, from the terminal device 3, a plurality of key data including information regarding the m-th row and the n-th column and first key data corresponding to the m-th row and the n-th column, information regarding the m-th row and the (n+1)-th column and second key data corresponding to the m-th row and the (n+1)-th column, and information regarding the (m+1)-th row and the n-th column and third key data corresponding to the (m+1)-th row and the n-th column, the keyset generation unit 31 combines the plurality of key data to generate a keyset. For example, in the example shown in FIG. 9, upon receiving a plurality of key data including the securities code (first key data) "XXXX" in the third row and the second column, information (second key data) regarding the year "2015" in the third row and the third column, and information (third key data) on "LAST DAY OF PERIOD" in the fourth row and the third column, the keyset generation unit 31 combines these pieces of information to generate one keyset "XXXX, 2015, LAST DAY OF PERIOD".

Figures 8, 9:
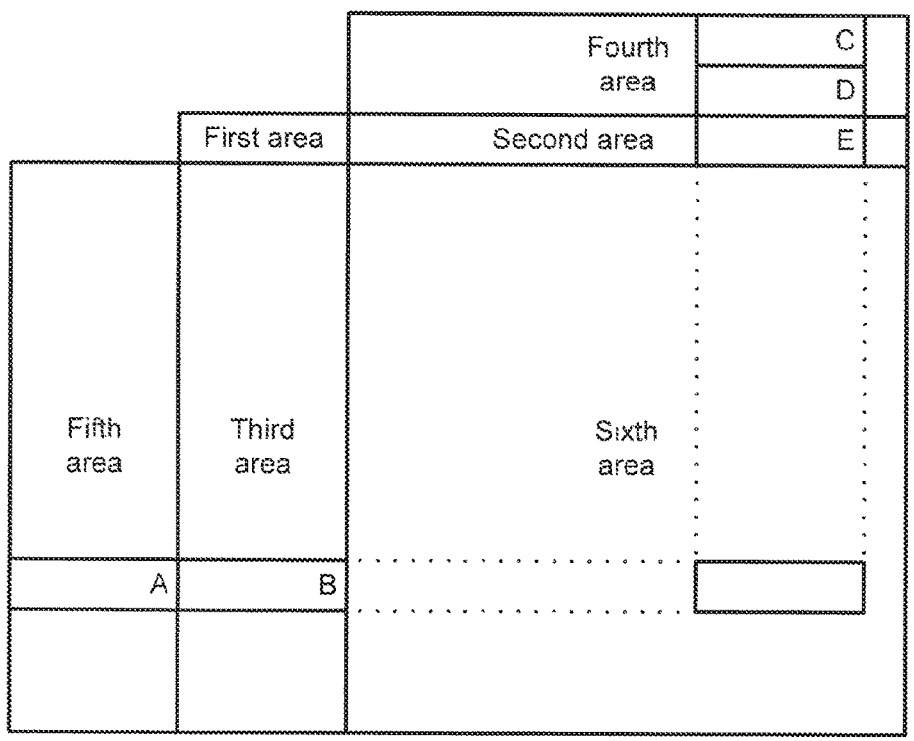
FIG. 8 is a diagram showing a concept of a table that is displayed on a terminal device according to an embodiment of the present invention.
FIG. 9 is a diagram showing an example of a table that is displayed on a terminal device according to an embodiment of the present invention.

A keyset is a combination of key data that are entered into a first area, a second area, a third area, a fourth area, and a fifth area shown in FIG. 8. A particular keyset is generated for a cell in a sixth area where the second area and the third area cross each other. For example, in a case where "XXXX" is entered in the first area, "E" is entered in a particular cell in the second area, "B" is entered in a particular cell in the third area, "A" is entered in a particular cell in the fifth area, and "C" and "D" are entered in particular cells, respectively, in the fourth area, the resulting keyset is "XXXX, A, B, C, D, E". Of the cells in the third area and the cells in the fifth area, cells of the same row (horizontal) become objects of the same keyset, and of the cells in the second area and the cells in the fourth area, cells of the same column (vertical) become objects of the same keyset.

The extraction unit 32 compares the keyset with a table storing key data that require inquiries at the database 6 or the data source 7 and extracts the first key data, the second key data, and the third key data from the keyset. For example, in a case where the keyset is "XXXX, A, B, C, D, E", the extraction unit 32 compares it with an accounting table 405 and extracts types of key data that are stored in the table. In a case where the accounting table 405 stores data corresponding to "XXXX", "A", "B", "D", and "E", these data are extracted.

On the other hand, in a case where the accounting table 405 does not store data corresponding to "C", this data is not extracted. There is such data that is not extracted, because there is a case where the data is necessary for a keyset but is not necessary for another keyset. Although the user has entered "C" by judging that "C" is necessary for a keyset, "C" may be unnecessary for another keyset, as a keyset is generated for the cell in the sixth area where the second area and the third area cross each other. The extraction unit 32 extracts necessary key data with reference to the table 4. This makes it only necessary for the user to enter data by simply judging whether the data is necessary for one keyset without worrying whether the data is unnecessary for another keyset, thus allowing the user to enter the data with comfort.

On the basis of the key data extracted by the extraction unit 32, the first inquiry unit 33 makes an inquiry at the database 6 for data (first result data) corresponding to the key data. For example, in a case where the key data extracted by the extraction unit 32 are "XXXX, 2015, NET PROFIT", the first inquiry unit 33 makes an inquiry at the database 6 for data on the net profit of the year 2015 of the securities code "XXXX". In a case where the database 6 has the data, the receiving unit 37 receives, for example, the data "16483 (in thousands of yen)". On the other hand, in a case where the database 6 does not have the data on the net profit of the year 2015 of the securities code "XXXX", the database 6 transmits, to the server 2, a signal indicating that the database 6 does not have the data.

Upon receiving, from the database 6, the signal indicating that the database 6 does not have the data (first result data) corresponding to the key data extracted by the extraction unit 32, the determination unit 36 compares the key data with a formula table 501 and determines whether a formula is included in the key data extracted by the extraction unit 32. For example, in a case where the key data extracted by the extraction unit 32 are "XXXX, 2015, NET PROFIT", comparing these key data with the formula table 501 shows that no formula is included in these key data. On the other hand, in a case where the key data extracted by the extraction unit 32 are "XXXX, 2015, PER", the determination unit 36 determines that a formula is included in these key data, as the formula table 501 has a "PER".

When the determination unit 36 has determined that the formula is included in the key data extracted by the extraction unit 32, the second inquiry unit 34 makes an inquiry at the database 6 for data (second result data) corresponding to the formula. For example, when the formula "PER" is included in the key data extracted by the extraction unit 32, the second inquiry unit 34 makes an inquiry at the database 6 for data corresponding to the PER. In a case where the database 6 has data on the PER (profit per earnings ratio) of the year 2015 of the securities code "XXXX", the database 6 transmits this data to the server 2. In a case where the database 6 does not have the data on the PER, the database 6 transmits, to the server 2, a signal indicating that the database 6 does not have this data.

Figure 5:
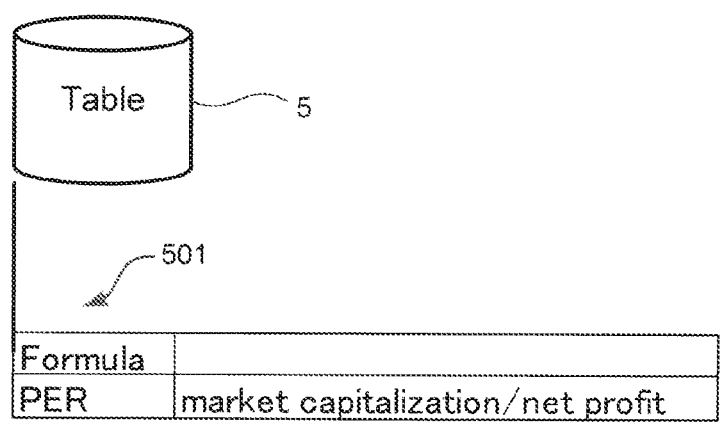
FIG. 5 is a diagram showing an example of a table according to an embodiment of the present invention.

In a case where the determination unit 36 has determined that the formula is not included in the key data extracted by the extraction unit 32, the third inquiry unit 35 makes an inquiry at the data source 7 for the data (first result data) corresponding to the key data extracted by the extraction unit 32. In this example, an example of the data source 7 is Bloomberg, Reuters, or the like, as data regarding a securities code is taken as an example. Upon receiving, from the database 6, the signal indicating that the database 6 does not have the data corresponding to the formula, the third inquiry unit 35 makes an inquiry at the data source 7 for the data (second result data) corresponding to the formula. In a case where the formula is "PER", the third inquiry unit 35 makes an inquiry for the market capitalization and net profit of the year 2015 of the securities code "XXXX", as reference to FIG. 5 shows that the PER is "MARKET CAPITALIZATION/NET PROFIT".

Note here that in making an inquiry at the data source 7 such as Bloomberg or Reuters, the server 2 converts the key data into a dedicated API (application programming interface). Such conversion of the key data into the dedicated API by the server 2 eliminates the need for a user of the terminal device 3 to use the dedicated API.

The receiving unit 37 receives, from the database 6 or the data source 7, the data (first result data) corresponding to the key data extracted by the extraction unit 32 or the data (second result data) corresponding to the formula. The transmitting unit 38 transmits, to the terminal device 3, these data received by the receiving unit 37. The foregoing has described the configuration of the server 2.

Configuration of Terminal Device

Next, a terminal device 3 according to an embodiment of the present invention is described with reference to FIG. 3. FIG. 3 is a block diagram showing an example configuration of a terminal device according to an embodiment of the present invention. The terminal device 3 includes a control unit 130, an operation unit 140, a display unit 150, a storage unit 160, a connection unit 170, and a communication unit 190. The operation unit 140, the display unit 150, the storage unit 160, the connection unit 170, and the communication unit 190 are identical in outline to their respective counterparts of the information processing apparatus 2 and, as such, are not described below.

The control unit 130 includes a display output unit 131, a transmitting unit 133, and a receiving unit 135. The display output unit 131 outputs the first to sixth areas so that the display unit 150 displays such a table as that shown in FIG. 8. The user can enter a securities code (first key data) into the first area. The user can also enter key data into the second to fifth areas, respectively. As shown in FIG. 8, the sixth area is an area formed by the second area and the third area crossing each other.

Upon entry of the first key data, the second key data, and the third key data into at least the first area, the second area, and the third area, respectively, of the first to fifth areas, the transmitting unit 133 transmits, to the server 2, the first key data and information regarding an area corresponding to the first key data, the second key data and information regarding an area corresponding to the second key data, and the third key data and information regarding an area corresponding to the third key data. For example, upon entry of "XXXX" into the first area, "2015" into the third row and the third column of the second area, and "NET PROFIT" into the seventh row and the second column of the third area, the transmitting unit 133 transmits these pieces of information to the server 2.

The receiving unit 135 receives result data from the server 2. The display output unit 131 outputs the result data to the sixth area. Upon entry of "XXXX" into the first area, "2015" into the third row and the third column of the second area, and "NET PROFIT" into the seventh row and the second column of the third area, the receiving unit 135 receives the result data "16483 (in thousands of yen)". The display output unit 131 outputs this result data to the seventh row and the third column of the sixth area so that the display unit 150 displays such a table as that of FIG. 9. The foregoing has described the terminal device 3.

Figure 4:
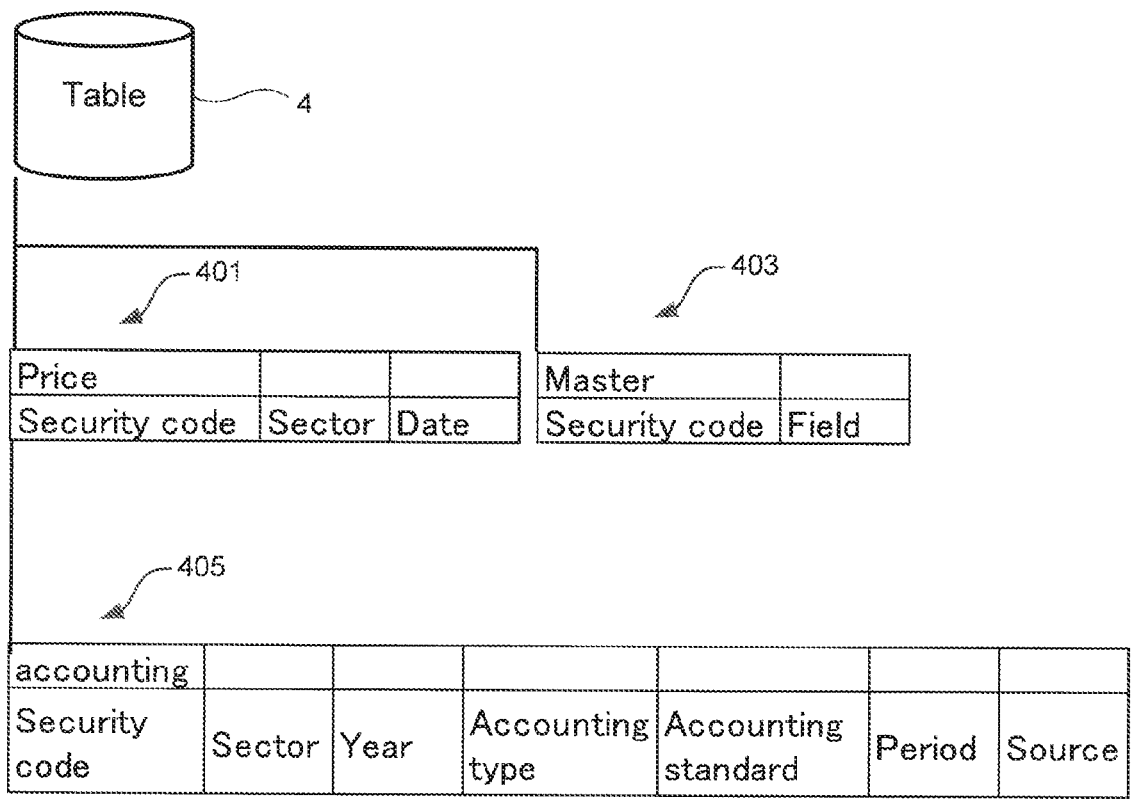
FIG. 4 is a diagram showing an example of a table according to an embodiment of the present invention.

Next, a table with which the extraction unit 32 of the server 2 makes comparisons is described with reference to FIG. 4. FIG. 4 is a diagram showing an example of a table according to an embodiment of the present invention.

A price table 401 includes a securities code, a sector, and a date. A Master table 403 includes a securities code and a sector. The accounting table 405 includes a securities code, a sector, a year, an accounting type, an accounting standard, a period, and a source. Data described in each of the tables include a conversion table (not illustrated). For example, a conversion table of securities codes stores "SECURITIES CODE" and the aforementioned securities code "XXXX" associated therewith. The sector includes sales, expenses, and the like. The accounting type includes information as to whether it is consolidated or non-consolidated. The accounting standard includes Generally Accepted Accounting Principles in the United States (US-GAAP), Japan's Generally Accepted Accounting Principles (JP-GAAP), and the like. The period includes periods such as a year, a first quarter, and a second quarter. The source includes actual data, consensus data, business forecasting data, and the like. The consensus data is forecast data that a target company makes public. For example, in FIG. 9, the net profit (forecast)—that the company given the securities code "XXXX" makes public is 12022 (in thousands of yen)—the business forecasting data is forecast data prepared by a company that forecasts corporate performance. For example, in FIG. 9, the sixth column, headed "AK", displays forecast data prepared by A Economy, Inc.

Next, a table storing a formula is described with reference to FIG. 5. FIG. 5 is a diagram showing an example of a table according to an embodiment of the present invention.

In the formula table 501, the formula for calculating a PER is stored as "MARKET CAPITALIZATION/NET PROFIT". The user can register a formula into the formula table 501. Although, in this example, the PER is stored, the user can set a formula as appropriate.

Flow of Operation of Server 2

Figure 6:
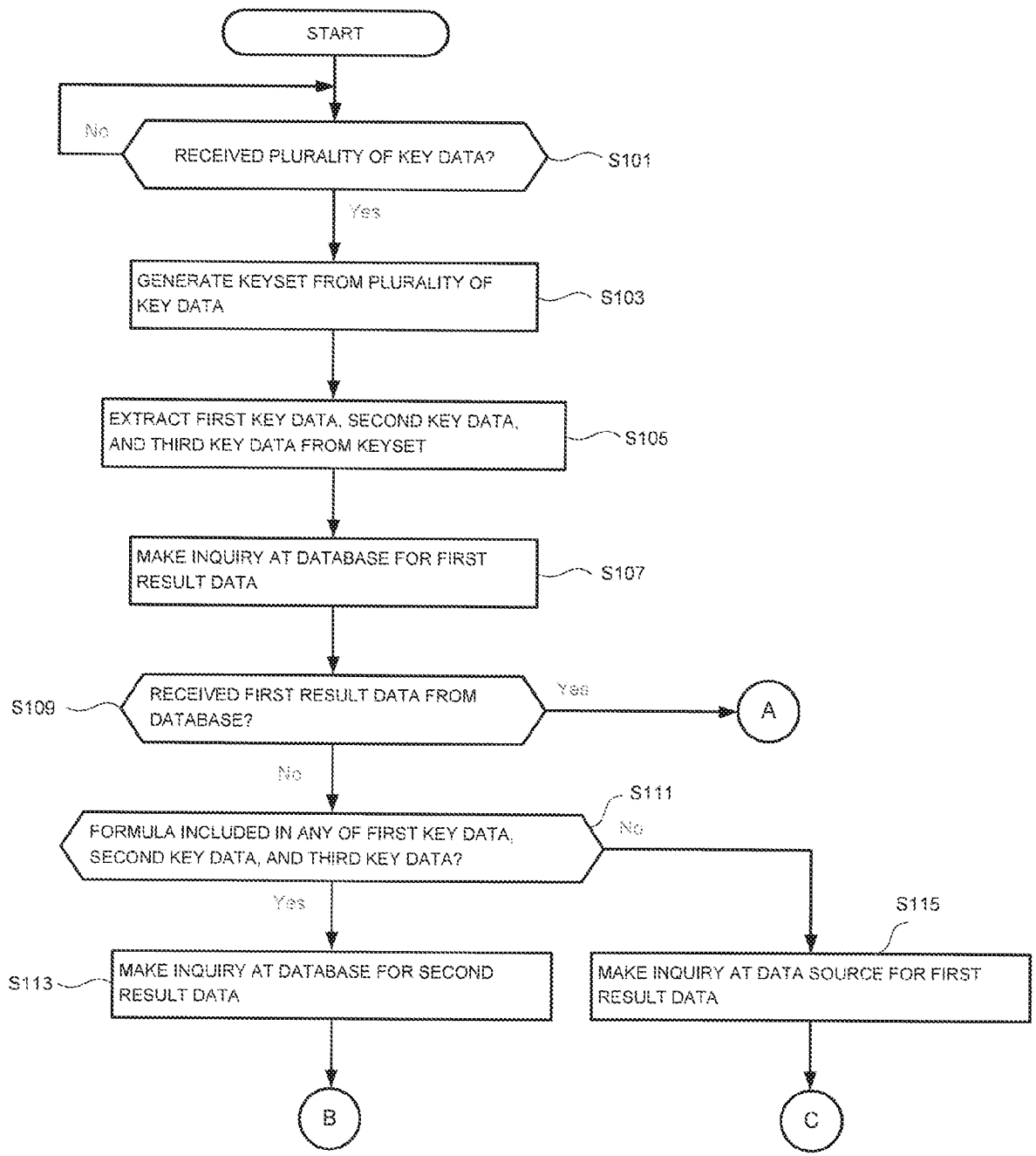
FIG. 6 is a diagram showing an example of a flow of operation of a server according to an embodiment of the present invention.
Figure 7:
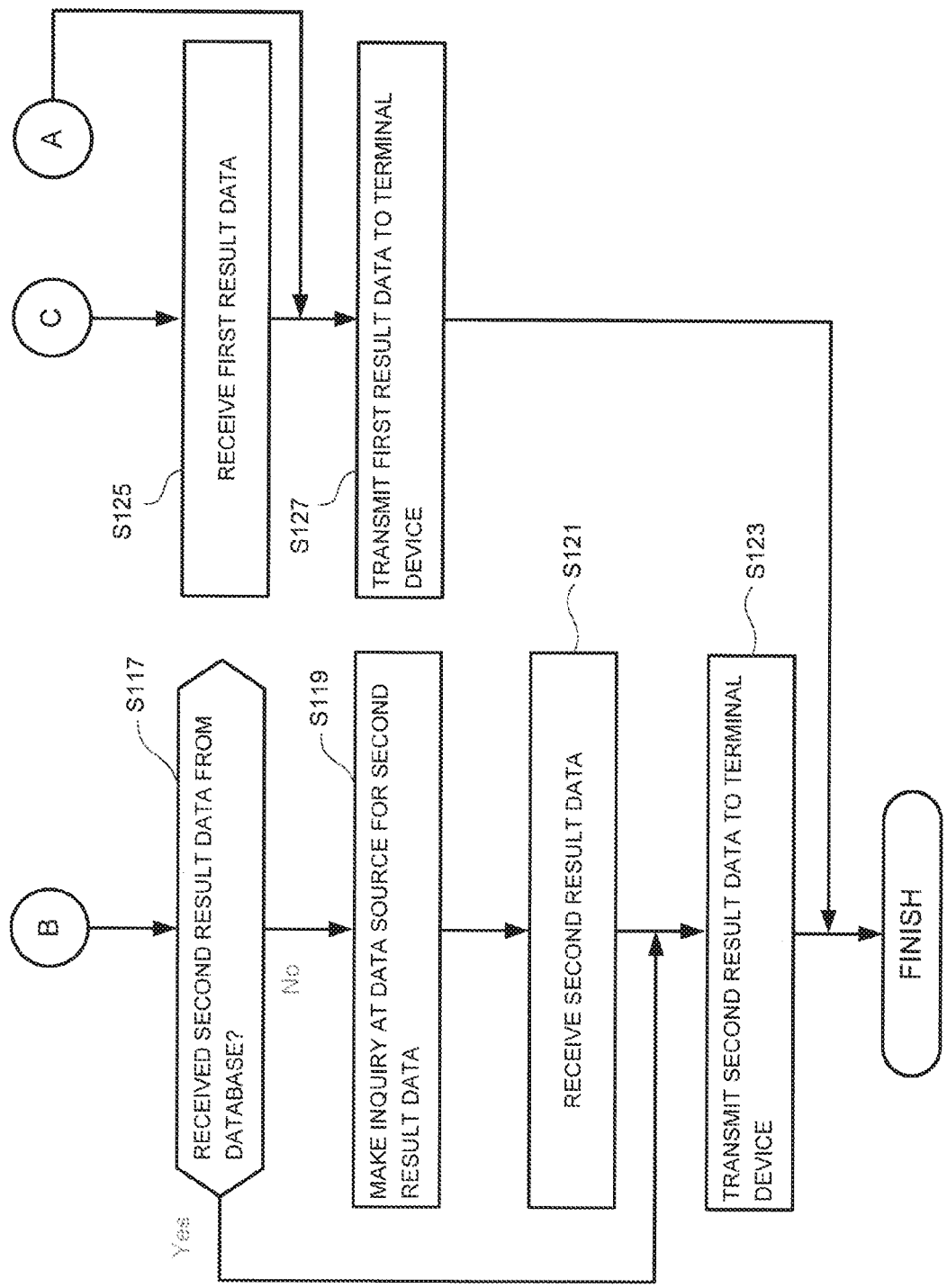
FIG. 7 is a diagram showing an example of a flow of operation of a server according to an embodiment of the present invention.

Next, a flow of operation of the server 2 is described with reference to FIGS. 6 and 7. FIG. 6 is a diagram showing an example of a flow of operation of a server according to an embodiment of the present invention. FIG. 7 is a diagram showing an example of a flow of operation of a server according to an embodiment of the present invention.

At step S101, it determines whether the server 2 has received a plurality of key data. In a case where the server 2 has received a plurality of key data (Yes in step S101)—the keyset generation unit 31 generates a keyset from the plurality of key data (step S103). On the other hand, in a case where the server 2 does not receive a plurality of key data (No in step S101), step S101 is repeated.

Next, the extraction unit 32 extracts first key data, second key data, and third key data from the keyset with reference to the table 4 (step S105). Suppose, for example, that the first key data is the securities code "XXXX", that the second key data is the year 2015, and that the third key data is a "PER". Next, the first inquiry unit 33 makes an inquiry at the database 6 for data (first result data) on the PER of the year 2015 of the securities code "XXXX" (step S107).

Next, it is determined whether the data on the PER of the year 2015 of the securities code "XXXX" has been received from the database 6 (step S109). In a case where the receiving unit 37 has received the data on the PER of the year 2015 of the securities code "XXXX" (Yes in step S109)—the transmitting unit 38 transmits the data thus received to the terminal device 3 (step S127). On the other hand, in a case where the receiving unit 37 did not receive the data on the PER of the year 2015 of the securities code "XXXX" (No in step S109)—the determination unit 36 determines whether a formula is included in any of the first key data, the second key data, and the third key data (step S111).

In a case where the formula is included (Yes in step S111)—the second inquiry unit 34 makes an inquiry at the database 6 for data corresponding to the formula (step S113). On the other hand, in a case where the formula is not included (No in step S111)—the third inquiry unit 35 makes an inquiry at the data source 7 for the data (step S115).

At step S117, it determines whether the data (second result data) corresponding to the formula has been received from the database 6 as a result of having made an inquiry at the database 6 for the data corresponding to the formula. Upon receiving, from the database 6, a signal indicating that the database 6 does not have the data corresponding to the formula (No in step S117)—the third inquiry unit 35 makes an inquiry at the data source 7 for the data corresponding to the formula (step S119) and receives the data (step S121). Upon receiving, from the data source 7, the data corresponding to the formula, the transmitting unit 38 transmits, to the terminal device 3, the data corresponding to the formula (step S123)—the foregoing has described example actions of the server 2.

Next, tables that are displayed on the display unit 150 of the terminal device 3 are described with reference to FIGS. 8 and 9. FIG. 8 is a diagram showing a concept of a table that is displayed on a terminal device according to an embodiment of the present invention. FIG. 9 is a diagram showing an example of a table that is displayed on a terminal device according to an embodiment of the present invention.

Referring to FIG. 8, the table has the first to sixth areas. The first area is an area formed by the third (m-th) row and the third (n-th) column in grid-like fashion. The second area is an area formed by the third row and the fourth and subsequent columns. The third area is an area formed by the third column and the fourth and subsequent rows. The fourth area is an area formed by the second and preceding rows and the fourth and subsequent columns. The fifth area is an area formed by the second and preceding columns and the fourth and subsequent rows. The sixth area is an area formed by the second area and the third area crossing each other and an area formed by the fourth and subsequent rows and the fourth and subsequent columns. Although, in this example, the first area is an area (cell) formed by the third row and the third column, the first area may alternatively be an area formed by the first row and the first column or the like. Although, in this example, the fourth area consists of two rows, it may alternatively consist of three or more rows. Similarly, although, in this example, the fifth area consists of one column, it may alternatively consist of two or more columns.

Referring to FIG. 9, upon entry of the securities code "XXXX" into the first area, for example "2015" into the second area, and for example "NET PROFIT" into the third area, "16483" is outputted to the sixth area. On the other hand, upon entry of the securities code "XXXX" into the first area, for example "2015" into the second area, for example "STOCK PRICE" into the third area, and "2/14/2015" into the fifth area, the securities code "XXXX", the sector "STOCK PRICE", and the date "2/14/2015" are extracted with reference to the price table 401, and inquiries are made first at the database 6 and then at the data source 7 about data corresponding to these data. Then, the stock price of the securities code "XXXX" as of Feb. 14, 2015 is transmitted from the database 6 or the data source 7, and the stock price "214.81 (yen)" is displayed on the table.

Upon entry of the securities code "XXXX" into the first area, for example "2015" into the second area, for example "STOCK PRICE AVERAGE" into the third area, and "YYYY" into the fifth area, the securities codes overlap; however, in a case where the same types of key data overlap, the server 2 selects a key data with the number of rows lower. Therefore, "YYYY", which has a lower row number, is selected. Then, in the sixth area, the stock price average "214.52 (yen)" of the year 2015 of the securities code "YYYY" is displayed. It should be noted that the method for selection in the case of an overlap may be set as appropriate by the user. Thus, in a case of need to display data regarding the securities code "YYYY" while displaying data regarding the securities code "XXXX", they can be displayed by simply entering "YYYY" into the fourth area or the fifth area. This provides a user-friendly terminal device 3.

An embodiment of the present invention provides a non-transitory computer readable medium storing a program causing a computer to execute: outputting a first area into which first key data is enterable through a user's operation, a second area into which second key data is enterable through the user's operation, a third area into which third key data is enterable through the user's operation, a fourth area into which fourth key data is enterable through the user's operation, a fifth area into which fifth key data is enterable through the user's operation, and a sixth area formed by the second area and the third area crossing each other; upon entry of the first key data, the second key data, and the third key data into at least the first area, the second area, and the third area, respectively, of the first to fifth areas, transmitting, to a server, the first key data and information regarding an area corresponding to the first key data, the second key data and information regarding an area corresponding to the second key data, and the third key data and information regarding an area corresponding to the third key data; and, upon receiving result data from the server, outputting the result data to the sixth area.

The first area may be an area formed by the m-th row and the n-th column in grid-like fashion. The second area may be an area formed by the m-th row and the (n+1)-th and subsequent columns. The third area may be an area formed by the n-th column and the (m+1)-th and subsequent rows. The fourth area may be an area formed by the (m−1)-th and preceding rows and the (n+1)-th and subsequent columns. The fifth area may be an area formed by the (n−1)-th and preceding columns and the (m+1)-th and subsequent rows. The sixth area may be an area formed by the (m+1)-th and subsequent rows and the (n+1)-th and subsequent columns. The information regarding the area corresponding to the first key data, which the transmitting unit transmits, may be information regarding a row and a column corresponding to the first key data. The information regarding the area corresponding to the second key data, which the transmitting unit transmits, may be information regarding a row and a column corresponding to the second key data. The information regarding the area corresponding to the third key data, which the transmitting unit transmits, may be information regarding a row and a column corresponding to the third key data.

First Modification

A time series mode is described with reference to FIGS. 10 and 11. FIG. 10 is a diagram showing a user interface that is displayed on a terminal device according to a modification of an embodiment of the present invention. FIG. 11 is a diagram showing an example of a table that is displayed on a terminal device according to a modification of an embodiment of the present invention.

A user interface 600 has a plurality of items, and the user can select from among alternatives or enter data for the plurality of items (as per FIG. 10, 601 is the header and rows 603 onwards are an example of common keys that the user can configure). Specifically, no securities code has been entered in this example, although the user can enter a securities code into a securities code 603. Further, the user can also enter "STOCK PRICE" into a sector 605. The user selects "FIXED DATE" in a range 613, and in this example, "6/1/2014" to "6/1/2016" is selected. The user selects "EVERY MONTH" in a cycle 615 and selects "ASCENDING ORDER" in an order 617. The cycle 615 is not limited to "EVERY MONTH" but may alternatively be "EVERY DAY", "EVERY OTHER MONTH", "QUARTER", "EVERY YEAR", or the like. The order 617 is not limited to "ASCENDING ORDER" but may alternatively be "DESCENDING ORDER" or the like.

The user can enter a date in a term end 607. However, in a case where the user does not enter a date, the end of the latest fiscal year is selected by default. Further, the user can enter performance or a forecast in a period type 609. In the case of performance, past data is targeted, and in the case of a forecast, future forecast data is targeted. However, in a case where the user does not enter these, "AUTO" is selected by default, and either performance or a forecast is selected as appropriate according to data that is acquired from the database 6 or the data source 7. Furthermore, the user can enter a source as appropriate in a source 611. In a case where there are a plurality of forecast data, it is possible, for example, to select forecast data (consensus data) disclosed by a targeted company itself or data forecast by "A ECONOMY".

When the user selects or enters data as shown in FIG. 10 through the user interface 600, "STOCK PRICE" is displayed in the first area of the table of FIG. 11. Further, the dates "6/1/2014" to "6/1/2016" are displayed in the third area. Next, the user enters securities codes such as "XXXX", "YYYY", and "JJJJ" into the second area. It should be noted that it is also possible to enter a securities code in the securities code 603 of the user interface 600. Then, when, at the stage where the stock prices, the dates, the securities codes have been displayed, the user performs a predetermined operation of transmitting, to the server 2, data on the stock prices, the dates, the securities codes entered in the cells, the respective stock prices are displayed in the sixth area.

First modification brings about the same effects as the embodiment. In addition, first modification makes it possible to easily display time series data by selecting or entering predetermined data through the user interface 600.

Second Modification

A table that is displayed on the terminal device 3 is described with reference to FIG. 12. FIG. 12 is a diagram showing an example of a table that is displayed on a terminal device according to a modification of an embodiment of the present invention. Second modification is substantially the same as first modification but is different from first modification in that "JPY" is entered and displayed in the fourth area.

In this example, the securities codes "XXXX" and "YYYY" represent Japanese companies. On the other hand, the securities code "JJJJ" represents an American company. In the case of an American company, the stock price is displayed in USD as shown in FIG. 11, unless otherwise designated. On the other hand, entering "JPY" into the fourth area causes the stock price to be displayed in Japanese yen as shown in FIG. 12. Specifically, when the terminal device 3 transmits key data "STOCK PRICE", "JJJJ", "6/1/2014", and "JPY" to the server 2, the keyset generation unit 31 generates a keyset "STOCK PRICE, JJJJ, 6/1/2014, JPY". Note here that in a case where "JJJJ" represents an American company, identification information to that effect is added to "JJJJ". When the first inquiry unit 33 makes an inquiry at the database 6, the first inquiry unit 33 also makes an inquiry not only about the stock price of the company "JJJJ" as of Jun. 1, 2014 but also about the exchange rate as of Jun. 1, 2014. In this example, the exchange rate as of Jun. 1, 2014 is 1 dollar=116.14 yen. Then, upon receiving these data from the database 6, the server 2 calculates the value "15679 yen" by multiplying the stock price "135 (U.S. dollars)" by "116.14 yen" and transmits the data to the terminal device 3. It should be noted that a specific flow of operation has already been described above.

Second modification brings about the same effects as the embodiment and first modification. In addition, since the user's entry of "JPY" makes it possible to display data such as stock prices in the same currency in a case where there are companies from a plurality of countries, the user can easily make comparisons between the companies.

The embodiment and modifications have been described on the premise that the tables of FIGS. 9, 11, and 12 are displayed on the display unit 150 of the terminal device 3. However, the server 2 may output the tables of FIGS. 9, 11, and 12 to a printer instead of transmitting the data to the terminal device 3. Alternatively, the server 2 may prepare tables such as FIGS. 9, 11, and 12 in the form of reports and transmit them via email.

Further, although the embodiment has been described above by taking data regarding securities as an example, this does not imply any limitation and targeted data include any data that can be acquired from data sources. For example, a wide range of data such as individual results of professional baseball and football players are applicable. The present invention is not limited to the embodiment described above but may be changed as appropriate without departing from the scope of the invention.

What is claimed is:

1. An information processing apparatus comprising:
a keyset generation unit configured to be implemented by a programmed processor, the keyset generation unit that, upon receiving, from a terminal device, a plurality of key data including a first information regarding a m-th row and a n-th column and a first key data corresponding to the m-th row and the n-th column, a second information regarding the m-th row and a (n+1)-th column and a second key data corresponding to the m-th row and the (n+1)-th column, and a third information regarding a (m+1)-th row and the n-th column and a third key data corresponding to the (m+1)-th row and the n-th column, combines the plurality of key data to generate a keyset;
an extraction unit configured to be implemented by a programmed processor, the extraction unit that compares the keyset with a table storing key data that require inquiries at a database or a data source and extracts the first key data, the second key data, and the third key data from the keyset;
a first inquiry unit configured to be implemented by a programmed processor, the extraction unit, the first inquiry unit that, on the basis of the first key data, the second key data, and the third key data extracted by the extraction unit, makes an inquiry at the database for a first result data corresponding to the first key data, the second key data, and the third key data;
a determination unit configured to be implemented by a programmed processor, the determination unit that, upon receiving, from the database, a signal indicating that the database does not have the first result data, compares the first key data, the second key data, and the third key data with a table storing a formula and determines whether the formula is included in any of the first key data, the second key data, and the third key data;
a second inquiry unit configured to be implemented by a programmed processor, the second inquiry unit that, when the determination unit has determined that the formula is included in any of the first key data, the second key data, and the third key data, makes an inquiry at the database for a second result data corresponding to the formula;
a third inquiry unit configured to be implemented by a programmed processor, the third inquiry unit that, when the determination unit has determined that the formula is not included in any of the first key data, the second key data, and the third key data, makes an inquiry at the data source for the first result data and, upon receiving, from the database, a signal indicating that the database does not have the second result data corresponding to the formula, makes an inquiry at the data source for the second result data;
a receiving unit configured to be implemented by a programmed processor, the receiving unit that receives the first result data or the second result data from the database or the data source; and
a transmitting unit configured to be implemented by a programmed processor, the transmitting unit that transmits the first result data or the second result data to the terminal device.

2. The information processing apparatus according to claim 1, further comprising a selection unit configured to be implemented by a programmed processor,
wherein the plurality of key data received by the keyset generation unit from the terminal device includes information regarding the (m+s)-th row and the n-th column and fifth key data corresponding to the (m+s)-th row and the n-th column,
wherein the selection unit that, in a case where it is determined that the first key data and the fifth key data are the same types of key data, selects either the first key data or the fifth key data in accordance with a preset order of priority,
wherein the keyset generation unit generates the keyset by combining a plurality of key data excluding the key data that the selection unit did not select from among the plurality of key data.

3. A method, a computer comprising:
a keyset generation unit, an extraction unit, a first inquiry unit, a determination unit, a second inquiry unit, a third inquiry unit, a receiving unit, a transmitting unit configured to be implemented by a programmed processor,
the method comprising:
causing the keyset generation unit to, upon receiving, from a terminal device, a plurality of key data including information regarding a m-th row and a n-th column and a first key data corresponding to the m-th row and the n-th column, information regarding the m-th row and a (n+1)-th column and a second key data corresponding to the m-th row and the (n+1)-th column, and information regarding a (m+1)-th row and the n-th column and a third key data corresponding to the (m+1)-th row and the n-th column, combine the plurality of key data to generate a keyset;
causing the extraction unit to compare the keyset with a table storing key data that require inquiries at a database or a data source and extract the first key data, the second key data, and the third key data from the keyset;
causing the first inquiry unit to, on the basis of the first key data, the second key data, and the third key data extracted, make an inquiry at the database for first result data corresponding to the first key data, the second key data, and the third key data;
causing the determination unit to, upon receiving, from the database, a signal indicating that the database does not have the first result data, compare the first key data, the second key data, and the third key data with a table storing a formula and determine whether the formula is included in any of the first key data, the second key data, and the third key data;
causing the second inquiry unit to, when it is determined that the formula is included in any of the first key data, the second key data, and the third key data, make an inquiry at the database for second result data corresponding to the formula;
causing the third inquiry unit to, when it is determined that the formula is not included in any of the first key data, the second key data, and the third key data, make an inquiry at the data source for the first result data and, upon receiving, from the database, a signal indicating that the database does not have the second result data corresponding to the formula, make an inquiry at the data source for the second result data;

causing the receiving unit to receive the first result data or the second result data from the database or the data source; and causing the transmitting unit to transmit the first result data or the second result data to the terminal device.

4. The method according to claim 3, further comprising a selection unit configured to be implemented by a programmed processor, wherein the plurality of key data received keyset generation unit from the terminal device include information regarding the (m+s)-th row and the n-th column and fifth key data corresponding to the (m+s)-th row and the n-th column, wherein the selection unit that, in a case where it is determined that the first key data and the fifth key data are the same types of key data, selecting either the first key data or the fifth key data in accordance with a preset order of priority, wherein the keyset generation unit generating the keyset by combining a plurality of key data excluding the key data that was not selected from among the plurality of key data.

5. A terminal device comprising:

a display output unit configured to be implemented by a programmed processor, the display output unit that outputs a first area into which a first key data is enterable through a user's operation, a second area into which a second key data is enterable through the user's operation, a third area into which a third key data is enterable through the user's operation, a fourth area into which a fourth key data is enterable through the user's operation, a fifth area into which a fifth key data is enterable through the user's operation, and a sixth area formed by the second area and the third area crossing each other; and a transmitting unit configured to be implemented by a programmed processor, the transmitting unit that, upon entry of the first key data, the second key data, and the third key data into at least the first area, the second area, and the third area, respectively, of the first to fifth areas, transmits, to a server, the first key data and information regarding an area corresponding to the first key data, the second key data and information regarding an area corresponding to the second key data, and the third key data and information regarding an area corresponding to the third key data, wherein upon receiving a result data from the server, the display output unit outputs the result data to the sixth area.

* * * * *